United States Patent [19]

Asher

[11] Patent Number: 4,469,330
[45] Date of Patent: Sep. 4, 1984

[54] CONTROLLER UNIT FOR VIDEO GAME

[75] Inventor: James C. Asher, San Jose, Calif.

[73] Assignee: Atari, Inc., Sunnyvale, Calif.

[21] Appl. No.: 337,881

[22] Filed: Jan. 7, 1982

[51] Int. Cl.³ .............................................. G06F 3/02
[52] U.S. Cl. ............................ 273/148 B; 273/85 G;
340/365 R; 74/471 XY; 200/6 A; 338/128
[58] Field of Search ............... 273/148 B, 1 GC, 1 E,
273/85 G, 85 R, DIG. 28; 200/6 A, 5 R;
338/172, 173, 191, 200, 128; 340/365 R; 74/471

[56] References Cited

U.S. PATENT DOCUMENTS

| | | | |
|---|---|---|---|
| 3,604,866 | 9/1971 | Darvasi | 338/200 X |
| 3,745,966 | 7/1973 | Seager | 74/471 XY X |
| 3,918,021 | 11/1975 | Nishioka et al. | 74/471 XY X |
| 3,942,148 | 3/1976 | Nishioka | 338/128 |
| 4,063,221 | 12/1977 | Watson et al. | 340/365 R X |
| 4,161,726 | 7/1979 | Burson et al. | 340/365 R |
| 4,275,611 | 6/1981 | Asher | 338/128 |
| 4,349,705 | 9/1982 | Kuhfus | 340/365 R X |
| 4,357,014 | 11/1982 | Baer et al. | 273/DIG. 28 X |

Primary Examiner—Richard C. Pinkham
Assistant Examiner—MaryAnn Stoll
Attorney, Agent, or Firm—Townsend and Townsend

[57] ABSTRACT

A combination keyboard/joystick controller is provided in which a joystick shaft is pivotally mounted on one end. The shaft passes through elongated apertures in two parallel plates. Each plate is capable of moving along an axis in response to joystick movement along that axis, and each plate is coupled to a potentiometer which therefore provides an analog output indicative of joystick movement along the two axes.

Also provided is a keyboard mounted on a flex circuit. An array of keys including a conductive material cooperate to cause electrical contact between traces on the flex circuit.

20 Claims, 11 Drawing Figures

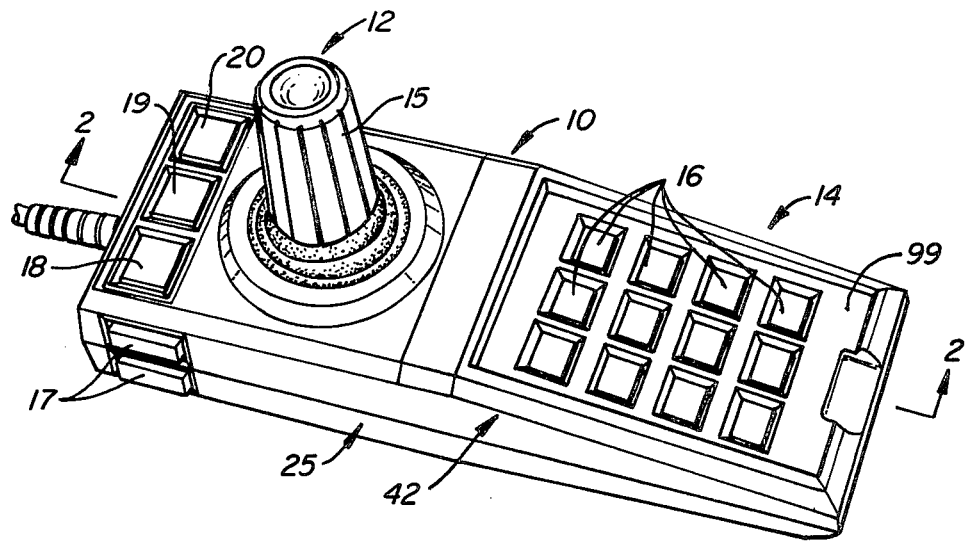
FIG._1.
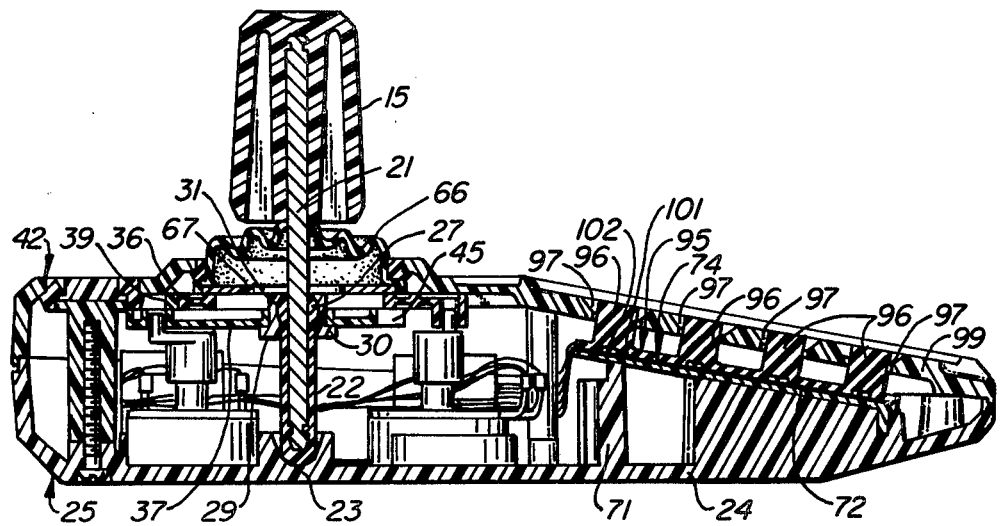
FIG._2.

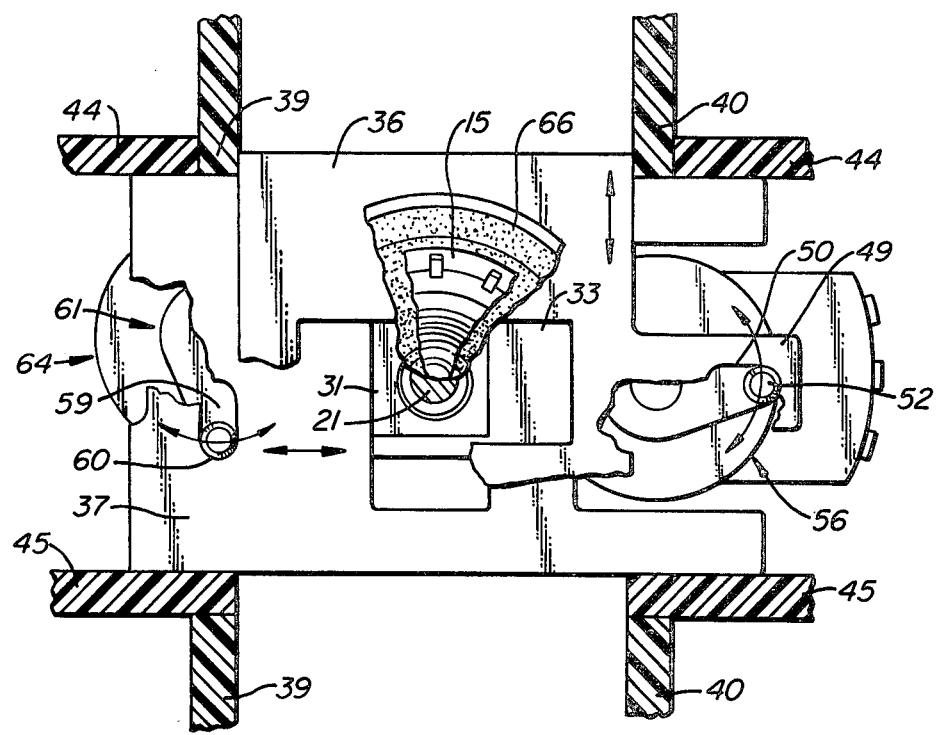
FIG._3.
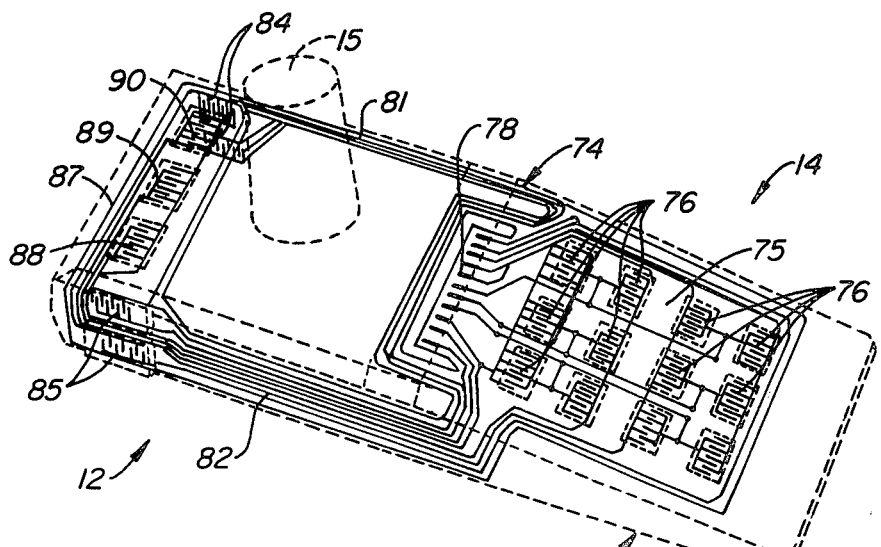
FIG._5.

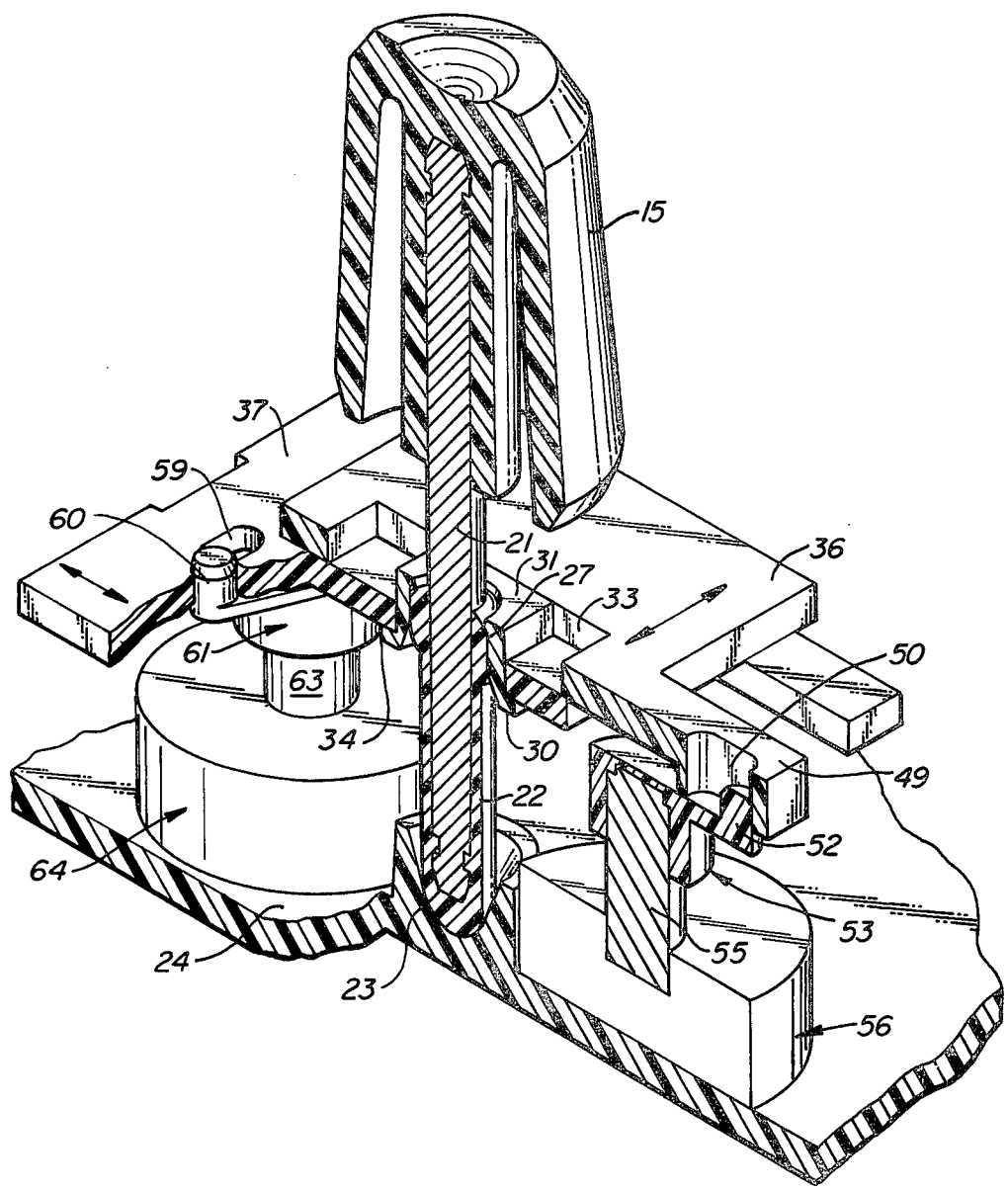
FIG._4.

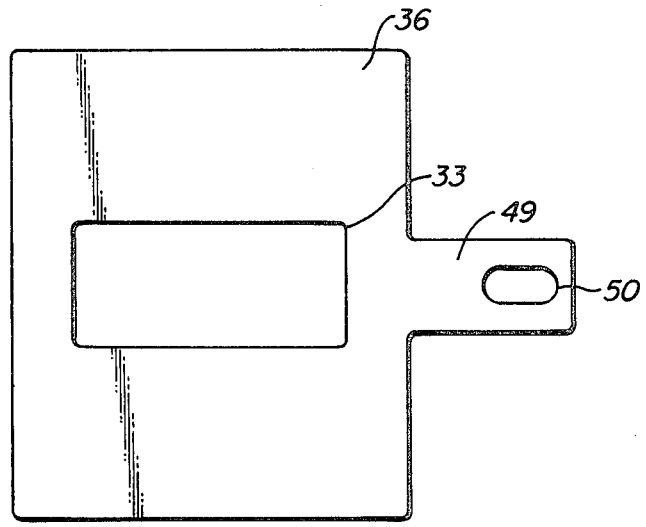
FIG.\_6.
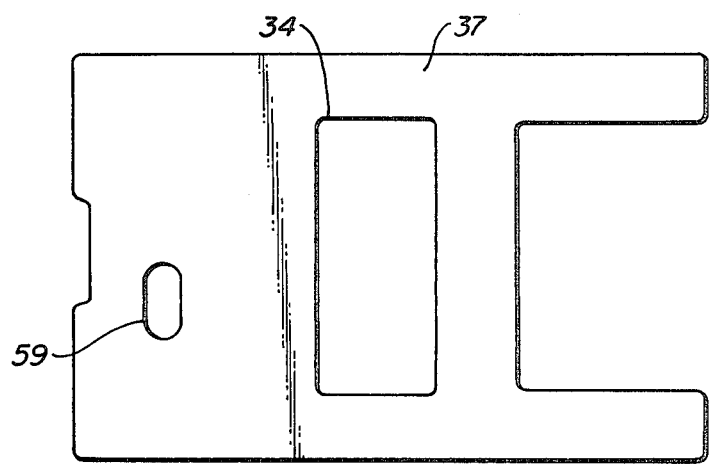
FIG.\_7.

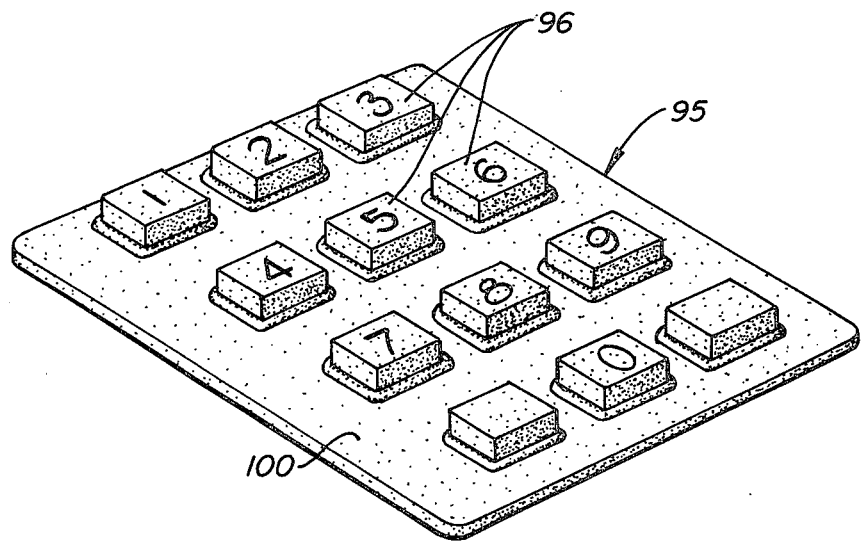
FIG._9.
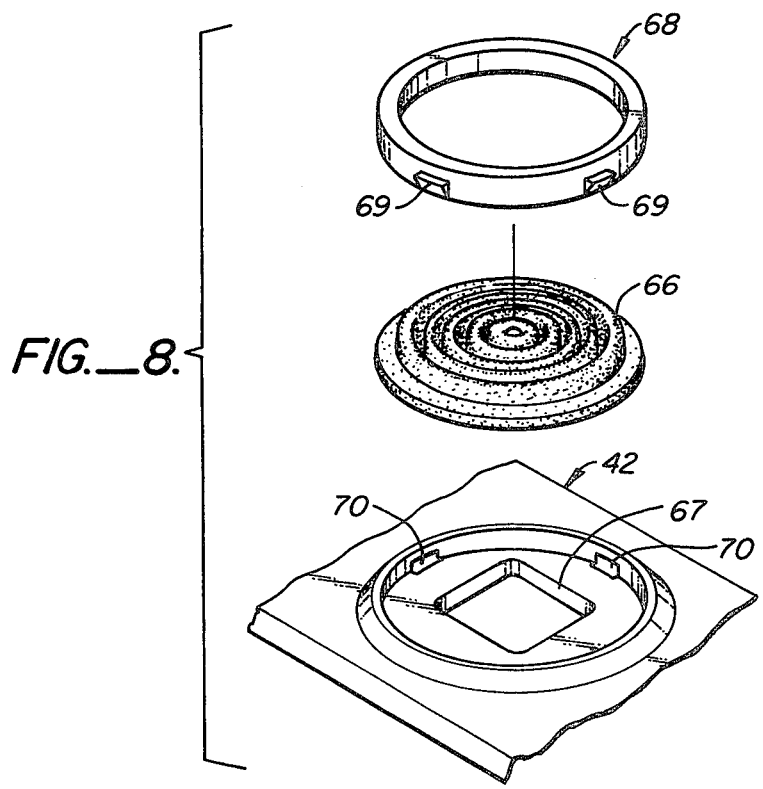
FIG._8.

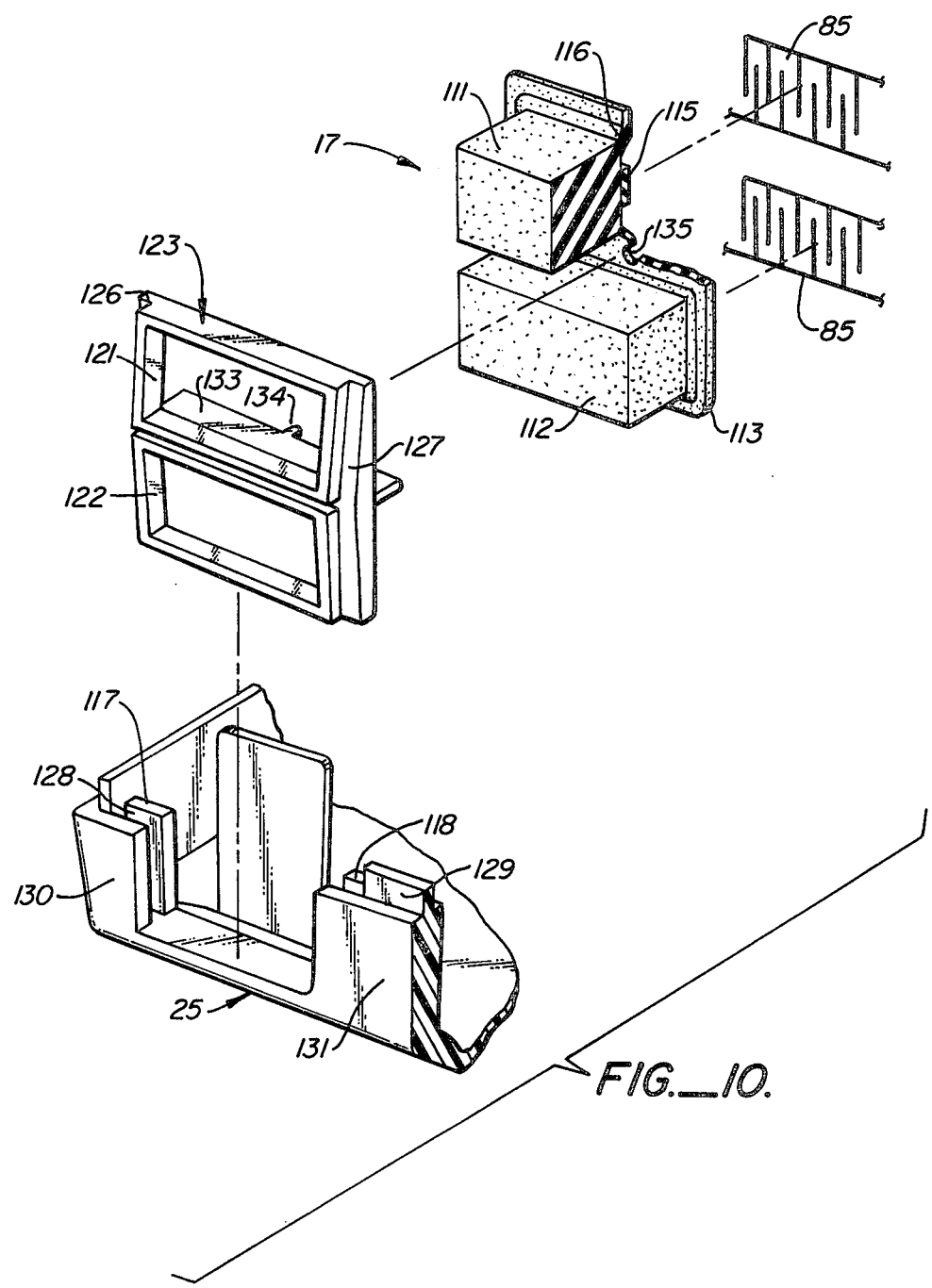
FIG._10.

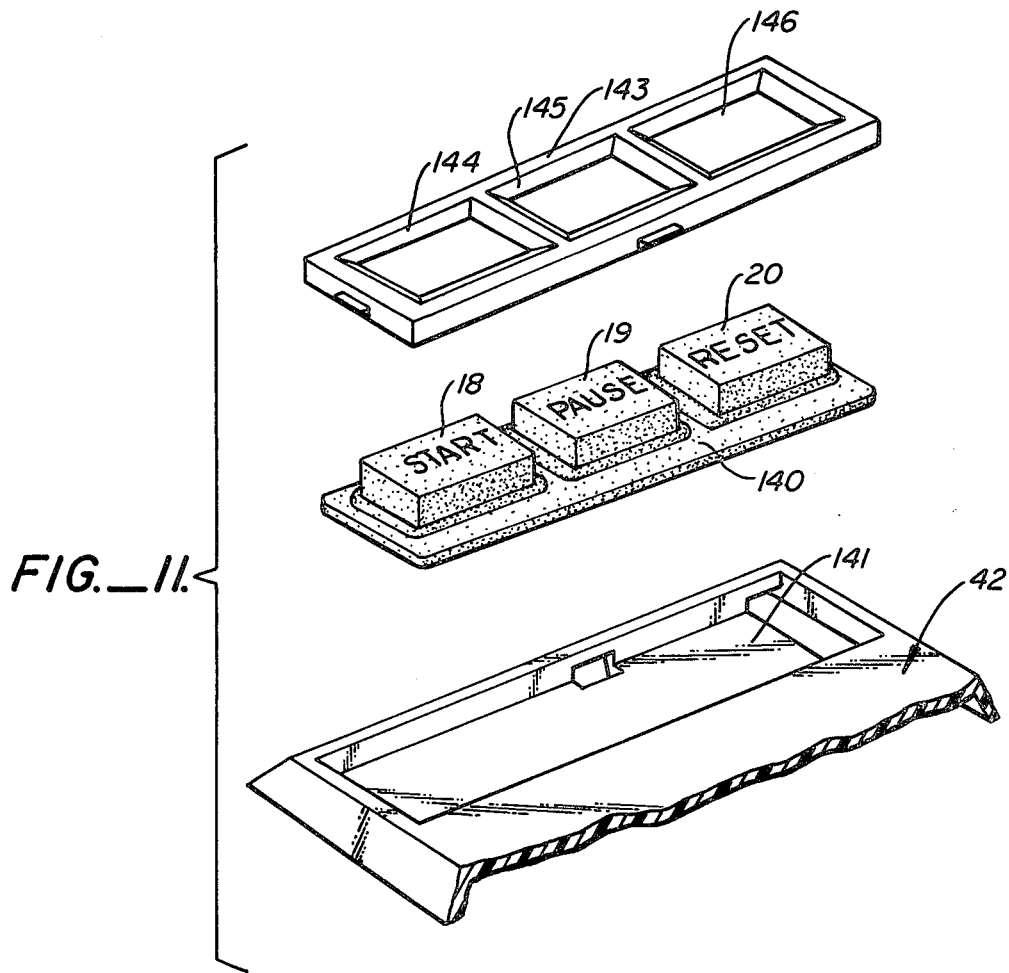
FIG._11.

CONTROLLER UNIT FOR VIDEO GAME

BACKGROUND OF THE INVENTION

This invention relates to controller units having a joystick control section and a keyboard control section, particularly for use in video games.

Controller units are known which are designed for the purpose of providing player input signals to video game circuitry. Such controllers are generally of two types: the joystick type and the keyboard type. The joystick type of controller unit typically includes a pivotally mounted manually operable joystick control arm and means for generating signals, which are interpreted by associated video game circuitry as desired motion or position signals for movable player display objects (e.g. a missile, an aircraft, a hockey player, etc.). Some joystick controller units are designed to produce digital motion signals, and such units typically include a plurality of associated contact switches positioned at the four quadrants of a circle for the purpose of providing X-Y switch closure signals. A representative controller unit of this type is shown in U.S. Pat. No. 4,124,787 to Aamoth et al. issued Nov. 7, 1978. Other joystick controller units are designed to produce analog motion signals and such units typically include a pair of potentiometers each having a driven shaft which follows the motion of the joystick along a particular orthogonal axis. Some analog joystick controller units, of which U.S. Pat. No. 4,275,611 to Asher issued June 30, 1981 is representative, require a biasing mechanism which automatically returns the joystick to a central neutral position when released. While such self-centering units are useful for some game applications, this feature is a disadvantage in many other game applications. Other analog joystick controller units do not incorporate a self-centering feature. Such units, however, must typically connect the joystick to the potentiometer by means of direct mechanical connectors—e.g. mechanical bails—which requires the potentiometer to be physically mounted in the unit with the axis of the control shaft perpendicular to the axis of the joystick (in the neutral position) which results in a controller unit having a thickness dimension dictated by the diameter of the potentiometer. Perhaps more importantly, the usual construction of a non-self-centering analog joystick controller unit provides no mechanical advantage between the joystick movement and the potentiometer control shaft rotation, which is undesirable in game applications. A joystick controller typically also includes an additional push button and associated switch for generating fire control signals for launching a missile display object, serving a tennis ball, and the like. Keyboard control units typically include a plurality of manually actuatable push buttons usually arranged in a standard twelve key pad configuration for the purpose of providing individual key switch signals which are interpreted by the associated video game circuitry as control signals for a movable player object (such as a boxer or a skier). In addition, known keyboard controllers include additional manually operable key switches mounted on the side of the controller housing for providing additional action function signals.

These two basically different types of controller units were originally independently developed for use with different types of dedicated video games each being capable of affording one type of game play only. With the advent of cartridge type video games, however, the need has developed for a universal type of controller capable of providing both the joystick and the keyboard type of control functions. In general, video game controller units must be relatively inexpensive to manufacture, due to the competitive nature of such consumer devices, and further such controller units must be extremely rugged and reliable in operation due to the rough handling and extensive use which such units encounter. In addition, as cartridge type video games become increasingly sophisticated, it is highly desirable to provide for both independent joystick and keyboard functional operation and also for combined joystick and keyboard functional operation, in order to afford the greatest flexibility for the use of a combined controller unit.

SUMMARY OF THE INVENTION

The preferred embodiment of the invention comprises a combined joystick and keyboard controller unit which is durable, relatively inexpensive to manufacture, and highly suitable for use with video games, both sophisticated and unsophisticated.

The preferred embodiment includes a housing for a joystick control portion and a keyboard control portion. The joystick control portion includes a control shaft pivotally mounted to a support in the housing and having a control knob positioned at the upper end and a central ball section for translating two independent motion translation members arranged in the housing for sliding motion in mutually orthogonal directions. Each motion translation member includes a central rectangular aperture for receiving a slide block captured by the ball section, each rectangular aperture having a long axis extending in the direction of motion of the other motion translation member so that each translation member can be independently operated. Each motion translation member further includes an aperture for receiving the operating end of a crank member, each crank member being attached to the input shaft of a different vernier signaling device, which in the preferred embodiment comprises an analog signal generator. Each vernier signaling device is secured within the housing against rotation, so that translation of the associated motion translation member in response to movement of the joystick control arm results in rotary motion via the crank mechanism of the vernier signaling device input shaft.

The keyboard section of the control unit includes a flex circuit switch matrix supported on a plate within the housing, and a resilient key switch overlay having individual upstanding key members positioned over associated conductive switch contact regions of the flex circuit and received within individual apertures in a cover portion of the housing. The flex circuit comprises a flexible plastic substrate having conductive patterns formed thereon, the flex circuit including a main body portion located under the key switch matrix and a pair of laterally spaced longitudinally extending arms extending from the keyboard region along the sides of the housing past the joystick portion to the opposite end of the housing. The terminal portion of each lateral arm includes a pair of switch contact regions arranged for use with a pair of key switch members mounted in the side of the housing. In addition, one of the lateral arms has a terminal portion extending inwardly across the inner top of the housing with a plurality of switch contact regions arranged for use with top mounted key switch members.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a perspective view of a preferred embodiment of the invention;

FIG. 2 is a sectional view taken along lines 2—2 of FIG. 1;

FIG. 3 is a compound top view of the joystick portion of the preferred embodiment showing individual elements partially broken away;

FIG. 4 is a perspective sectional view of the joystick portion of the preferred embodiment;

FIG. 5 is a perspective view of the flex circuit with the housing shown in phantom;

FIG. 6 is a plan view of upper actuator plate 36;

FIG. 7 is a plan view of lower actuator plate 37;

FIG. 8 is an exploded perspective view of the dust seal and retainer ring;

FIG. 9 is a perspective view of the flexible switch matrix;

FIG. 10 is a partial exploded perspective view of the side mounted switch elements; and FIG. 11 is a partial exploded perspective view of the auxiliary switch elements.

DESCRIPTION OF THE PREFERRED EMBODIMENT

Turning now to the drawings, FIG. 1 shows a combined joystick keyboard controller unit according to the invention and generally designated by reference numeral 10. As seen in this Fig., the controller unit includes a joystick portion generally designated by reference numeral 12 and a keyboard portion generally designated by reference numeral 14. Joystick portion 12 includes a manually operable control knob 15 for providing 360° player object motion signals to an associated video game unit, the control knob 15 being mounted for pivotal motion about an axis in the manner described below. Keyboard portion 14 includes a plurality of manually actuatable key switches 16 for providing individual player action signals for the associated video game unit. In addition to the key switches 16, controller unit 10 is further provided with side mounted key switches 17, which normally function as fire control buttons, and top mounted key switches 18-20, which preferably function as a game start switch, game pause switch, and game reset switch, respectively.

With reference to FIGS. 2-4, the joystick portion of controller unit 10 includes a control shaft 21 having an upper end on which the control knob 15 is mounted by press fitting, and a lower end to which a combination pivot piece and ball socket 22 is attached. Shaft 21 is preferably fabricated from a suitable metal, such as steel, while the member 22 is fabricated from a hard smooth molded plastic material. The lower end member 22 is received in a pivot socket portion 23 formed in the lower wall 24 of the bottom casing section 25, and provides a pivotal support for the control shaft 21. The ball socket portion 27 of member 22 is captured by a slide block 29 having a lower flange 30 and a central rectangular upper portion 31. Central rectangular upper portion 31 is slidably received in a pair of rectangular apertures 33, 34 formed, respectively, in an upper motion translating or actuator plate 36 (FIG. 6) and a lower motion translating or actuator plate 37 (FIG. 7). Upper actuator plate 36 is constrained for motion transversely of the controller housing by means of guide ribs 39, 40 formed in the upper half casing 42 of controller unit 10 as partially depicted in FIG. 3; while bottom actuator plate 37 is constrained to translatory motion longitudinally of the controller unit 10 by means of guide ribs 44, 45 similarly formed in the top casing 42.

Bottom actuator plate 37 is supported from below by flange 30 of slide block 29. The position of each actuator plate 36, 37 is controlled by the upper rectangular portion 31 of the slide block 39 and, as best seen in FIG. 3, motion of slide block 39 in a direction transverse of the controller unit 10 causes translatory motion of upper actuator plate 36, while motion of slide block 29 in the longitudinal direction of controller unit 10 results in translatory motion of lower actuator plate 37. Motion of slide block 29 along directions intermediate the two orthogonal directions results in translatory motion of both actuator plates 36, 37.

Upper actuator plate 36 includes an arm 49 having an aperture 50 in which the driven end 52 of a crank mechanism 53 is loosely received. Crank mechanism 53 is mounted onto the input shaft 55 of an analog signal generating device 56 which in the preferred embodiment comprises a potentiometer having a substantially linear resistance characteristic. Similarly, lower actuator plate 37 includes an aperture 59 in which the operating end 60 of a crank mechanism 61 is loosely received. Crank mechanism 61 is secured to the operating shaft 63 of an analog signal generating device 64, which also preferably comprises a potentiometer. As will be appreciated by those skilled in the art, linear motion of the actuator plates 36, 37 is converted into rotary motion of the shafts 55, 63 by crank mechanisms 53, 61. The mechanical advantage of the system is determined by the distance between the center of radius of the pivot piece on the lower end of shaft 21 and the mid-point of the ball socket portion 27 of compound piece 22, and the distance between the axis of each potentiometer control shaft and the axis of the driven end of the corresponding crank arm. In the preferred embodiment, these dimensions are 0.855 in. and 0.325 in., respectively, which provides a mechanical advantage of approximately 3:1. More specifically, angular movement of shaft 21 over the full 30° range of permitted movement (measured with respect to an axis normal to actuator plates 36, 37) results in angular rotation of shafts 55, 63 of 90°.

The joy stick portion 12 of controller unit 10 further includes a dust seal 66 which surrounds the operating shaft 21 and the access aperture 67 formed in the top casing 42, the dust seal 66 being retained along the periphery by means of a retainer ring 68 having a plurality of nibs 69 which are snap fitted into corresponding apertures 70 (see FIG. 8).

The keyboard portion 14 includes a support member 71 (FIG. 2) and a support plate 72 on which a flex circuit generally designated by reference numeral 74 is positioned. As is best seen in FIG. 5, flex circuit 74 includes a central body portion 75 having a plurality of switch sites 76 formed in the top surface thereof. Each switch site 76 includes a comb-like section with a plurality of spaced contact fingers adapted to be bridged by a conductive member in the manner described below. Main body portion 75 of flex circuit 74 terminates in an output contact region 78 adapted to be electrically and mechanically coupled to a conventional connector block (not shown) for the purpose of furnishing output signals to the associated video game unit.

Flex circuit 74 further includes first and second laterally spaced arm portions 81, 82 extending along the inner side surface of controller unit 10 past the joy stick portion 12 to the upper end of the controller unit 10. Arm portion 81 terminates in a free end having a pair of key contact regions 84 in a position to be operated by the right hand fire buttons 17. Arm portion 82 similarly includes a pair of key contact regions 85 positioned to be operated in conjunction with left hand fire buttons 17, and further includes a transversely extending end portion 87 having three key contact regions 88, 89 and 90 which are positioned along the inner top surface of controller unit 10 at a location underneath key switches 18, 19, and 20 respectively.

Flex circuit 74 is a fabricated from a thin, tough flexible plastic material on which the conductive paths and key switch regions illustrated are deposited.

Referring again to FIG. 2, a flexible switch matrix generally designed by reference numeral 95 and shown in perspective in FIG. 9 is positioned on the top surface of flex circuit 74, the switch matrix 95 having a plurality of individual key switch elements 96 each located within a different aperture 97 formed in the keyboard section 99 of top casing 42. Each key switch element 96 terminates at the lower end in a recessed portion 101 having a conductive button 102 received therein and normally spaced above the corresponding key contact region of flex circuit 74. Whenever the top surface of a key switch element 96 is depressed by the player, the conductive button 102 makes contact with the spaced fingers of a corresponding key contact region of flex circuit 74 to provide an electrical switch closure.

FIG. 10 illustrates the construction of the side mounted key elements, with only the left hand side being illustrated. As seen in this Fig., key elements 111, 112 are molded in a connecting web 113 and each element 111, 112 is provided with a conductive button 115 normally located within a recess 116 formed in the inner surface of the unit. Button 115 is physically arranged to bridge the conductive fingers in upper contact region 85. The lower side edges of web 113 are positioned inwardly of a pair of inner walls 117, 118 formed in lower casing 25, and the key elements extend outwardly from a pair of correspondingly shaped apertures 121, 122 formed in a side bezel 123. Side bezel 123 has a pair of edge margins 126, 127 which are received in a pair of slots 128, 129 formed by inner walls 117, 118 and outer side wall portions 130, 131. Side bezel 123 also has a transverse backing brace 133 provided with a locating pin 134 which is received in locating aperture 135 formed in the center of web 113.

FIG. 11 illustrates the construction of the top mounted auxiliary key elements 18-20. As seen in this Fig., key elements 18-20 are similar in structure to the side mounted key elements of FIG. 10, and are interconnected by means of an integrally molded web 140. Each key element 18-20 has a corresponding normally recessed conductive button (not shown) arranged to bridge the contact regions 88-90 (FIG. 5) when the corresponding key element is actuated. A recess 141 accommodates both the transverse end 87 of flex circuit arm 82 and the key element web 140. A snap-in bezel 143 having key element apertures 144-146 retains the assembly in place.

As will now be apparent, controller units fabricated according to the invention possess several advantages when used in conjunction with consumer type video games. Firstly, the controller unit is extremely inexpensive to fabricate since the majority of parts are made from molded plastic or other low cost materials (such as flex circuit 74 and switch matrix 95). Moreover, the unit is relatively simple to assemble so that the manufacturing cost is relatively low. Once assembled, the units are extremely rugged, particularly when the casing is fabricated from a high impact plastic material. In addition, the extremely simple keyboard switching mechanism and joy stick mechanism are highly tolerant to abuse and are highly reliable over extensive periods of use.

Another advantage of the invention resides in the electrical and mechanical characteristics of the joy stick portion. Firstly, the use of substantially linear potentiometers or other vernier signal generating devices provides continuous analog position signals over 360° of joy stick rotation. This is in contrast to conventional game joy stick units, which employ as few as four quadrant switches which provide a minimum angular increment signal of 45°. Thus, the actual position of the player's joystick can be measured with extreme accuracy, to a linear vernier scale if desired. Further, it is important to note that, unlike conventional game joysticks, no mechanical biasing is used in the invention so that the player may manipulate the joystick control knob 15 to a particular position release the knob 15 and the joystick will remain in that position until further manipulated. This frees the player's hand to operate the keyboard portion of the controller unit, which is an important feature in many of the current sophisticated video games. For example, in a football game the joystick may be used to control a quarterback who may be manipulated to a position, by the player and left in that position while the player manipulates a forward pass key 16. As another example, in a space battle game, the joystick may control a player's spaceship and the position of the joystick may indicate both the direction and speed of movement, so that the player may set his course and speed and then operate the keyboard switches 16.

While the above provides a full and complete disclosure of the preferred embodiment of the invention, various modifications, alternate constructions and equivalents may be employed without departing from the true spirit and scope of the invention. Therefore, the above description and illustration should not be construed as limiting the scope of the invention which is defined by the appended claims.

I claim:

1. A controller unit for a video game circuit comprising:

a housing having top and bottom casing portions;

a keyboard unit located adjacent a first end of said housing, said keyboard unit comprising a support member, a flex circuit member having a main body portion with a plurality of spaced key contact regions positioned on the upper surface thereof and an output connector region for manifesting switch closure signals, a key switch matrix positioned over said flex circuit member and having a plurality of key elements each including an electrically conductive contact member, each contact member corresponding to a different one of said spaced key contact regions and adapted to contact the associated key contact region when actuated, and a plurality of apertures formed in said top casing portion for receiving the upper portion of said key elements; and a joystick unit located adjacent said keyboard unit, said joystick unit comprising a base pivot mounted in said bottom casing portion, a control shaft extending through the height of said housing and then terminating in said base pivot, the terminating point of said control shaft pivotally received in said base pivot, an upper free end, and a centrally located ball portion, a slide block rotatably secured to said ball portion and having a lower flanged portion and an upper motion control portion, a first actuator plate mounted in said housing for translatory motion along a first direction, a second actuator plate mounted in said housing for translatory motion along a second orthogonal direction, said actuator plates each being provided with a central elongated aperture for receiving the upper motion control portion of said slide block, said elongated apertures having mutually orthogonal long axes, first and second signal generating means secured to said housing and having a driven control shaft, and first and second motion converting means each having an operating arm coupled to a different corresponding one of said first and second actuator plates for motion therewith and a driving end coupled to a corresponding one of said first and second signal generating means control shafts for converting translatory motion of said first and second actuator plates to rotary motion of said signal generating means control shafts.

2. The combination of claim 1 wherein said top casing portion of said housing is provided with a downwardly depending set of guide channels for confining said first and second actuator plates for motion along said first and second orthogonal directions, respectively.

3. The combination of claim 1 wherein said first and second signal generating means each comprises a potentiometer having a substantially linear electrical resistance characteristic.

4. The combination of claim 1 wherein said controller unit further includes an additional key switch matrix located adjacent the other end of said housing and having a plurality of key elements each including an electrically conductive contact member, and a corresponding plurality of additional apertures formed in said top casing portion for receiving the upper portion of said additional key elements; and wherein said flex circuit member further includes at least one laterally spaced arm member extending from said first end to said other end of said housing, said arm member terminating in an end portion extending transversely of said housing and having a plurality of said spaced key contact regions each underlying a different one of said additional electrically conductive contact members.

5. The combination of claim 4, wherein said top casing portion includes an elongated aperture extending transversely thereof and a separate bezel member secured in said elongated aperture, said bezel member having said additional apertures formed therein.

6. The combination of claim 1, wherein said controller unit further includes another key element having an electrically conductive contact member, said another key element being located adjacent the other end of said housing along a side wall thereof, and another aperture formed in said side wall of said housing for receiving the outer portion of said another key element; and wherein said flex circuit member further includes a laterally spaced arm member extending along said side wall from said first to said other end of said housing, said arm member terminating in an end portion having a key contact region facing said electrically conductive contact member of said another key element.

7. The combination of claim 6, wherein said side wall includes an opening and said housing includes a separate side bezel member received in said opening, said side bezel member having said another aperture formed therein.

8. The combination of claim 6, wherein said controller unit further includes still another key element having an electrically conductive contact member, said still another key element being located adjacent the other end of said housing along the other side wall thereof, and still another aperture formed in said other side wall of said housing for receiving the outer portion of said still another key element; and wherein said flex circuit member further includes another laterally spaced arm member extending along said other side wall from said first to said other end of said housing, said another arm member terminating in an end portion having a key contact region facing said electrically conductive contact member of said still another key element.

9. The combination of claim 8, wherein said other side wall includes another opening and said housing includes another separate side bezel member received in said another opening, said another separate side bezel member having said still another aperture formed therein.

10. The combination of claim 1, wherein said controller unit further includes another key switch matrix having a pair of key elements each having an electrically conductive member, said another key switch matrix being located adjacent the other end of said housing along the side wall thereof, and another pair of apertures formed in said side wall of said housing for receiving the outer portions of said another pair of key elements; and wherein said flex circuit member further includes a laterally spaced arm member extending along said side wall from said first to said other end of said housing, said arm member terminating in an end portion having a pair of spaced key contact regions each facing a different one of said electrically conductive contact members of said another pair of key elements.

11. The combination of claim 10, wherein said side wall includes an opening and said housing includes a separate side bezel member received in said opening, said side bezel member having said another pair of apertures formed therein.

12. The combination of claim 10, wherein said controller unit further includes still another key switch matrix having another pair of key elements each having an electrically conductive member, said still another key switch matrix being located adjacent the other end of said housing along the other side wall thereof, and still another pair of apertures formed in said other side wall of said housing for receiving the outer portions of said still another pair of key elements;

and wherein said flex circuit member further includes another laterally spaced arm member extending along said other side wall from said first to said other end of said housing, said another arm member terminating in an end portion having another pair of spaced key contact regions each facing a different one of said electrically conductive contact members of said still another pair of key elements.

13. The combination of claim 12, wherein said other side wall includes another opening and said housing includes another separate side bezel member received in said opening, said another separate side bezel member having said still another pair of apertures formed therein.

14. A controller unit for a video game circuit comprising:
a housing having top and bottom casing portions;
a keyboard unit located adjacent a first end of said housing, said keyboard unit comprising a support member, a flex circuit member having a main body portion with a plurality of spaced key contact regions positioned on the upper surface thereof and an output connector region for manifesting switch closure signals, a key switch matrix positioned over said flex circuit member and having a plurality of key elements each including an electrically conductive contact member, each contact member corresponding to a different one of said spaced key contact regions and adapted to contact the associated key contact region when actuated, a plurality of apertures formed in said top casing portion for receiving the upper portion of said key elements, first and second additional key switch matrices each having a pair of key elements each having an electrically conductive member, said first additional key switch matrix being located adjacent the other end of said housing along a side wall thereof, said second additional key switch matrix being located adjacent the other end of said housing along the other side wall thereof, and first and second additional pairs of apertures formed in said side wall and said other side wall, respectively, for receiving the outer portions of said first and second pairs of additional key elements, respectively; said flex circuit member further including a first laterally spaced arm member extending along said side wall from said first to said other end of said housing, said first arm member terminating in an end portion having a first pair of spaced key contact regions each facing a different one of said electrically conductive contact members of said first pair of additional key elements, and a second laterally spaced arm member extending along said other side wall from said first end to said other end of said housing, said second arm member terminating in an end portion having a second pair of spaced key contact regions each facing a different one of said electrically conductive contact members of said second pair of additional key elements; and
a joystick unit located between said keyboard unit and said first and second additional key switch matrices, said joystick unit comprising a base pivot mounted in said bottom casing portion, a control shaft extending through the height of said housing and then terminating in said base pivot, the terminating point of said control shaft pivotally received in said base pivot, an upper free end, and a centrally located ball portion, a slide block rotatably secured to said ball portion and having a lower flanged portion and an upper motion control portion, a first actuator plate mounted in said housing for translatory motion along a first direction, a second actuator plate mounted in said housing for translatory motion along a second orthogonal direction, said actuator plates each being provided with a central elongated aperture for receiving the upper motion control portion of said slide block, said elongated apertures having mutually orthogonal long axes, a set of guide channels depending downwardly in said housing for confining said first and second actuator plates to motion along said first and second orthogonal directions, respectively, first and second signal generating means secured to said housing and having a driven control shaft, and first and second motion converting means each having an operating arm coupled to a different corresponding one of said first and second actuator plates for motion therewith and a driving end coupled to a corresponding one of said first and second signal generating means control shafts for converting translatory motion of said first and second actuator plates to rotary motion of said signal generating means control shafts.

15. The combination of claim 14 wherein said side wall and said other side wall each includes an opening and said housing includes a pair of separate side bezel members each received in a different one of the side wall openings, each separate side bezel member having a different one of said first and second additional pairs of apertures formed therein.

16. The combination of claim 14 wherein said control unit further includes a third additional key switch matrix located adjacent the other end of said housing and having a plurality of key elements each including an electrically conductive contact member, and a corresponding plurality of further apertures formed in said top casing portion for receiving the upper portion of said additional key switch matrix key elements; and wherein said flex circuit member further includes an end portion extending from one of said first and second arm members transversely of said housing and having a plurality of said spaced key contact regions each underlying a different one of said additional key switch matrix key element electrically conductive contact members.

17. The combination of claim 16 wherein said top casing portion includes an elongate aperture extending transversely thereof and a separate top bezel member secured in said elongate aperture, said top bezel member having said further apertures formed therein.

18. An analog joystick controller comprising:
a housing;
a control shaft movably supported in said housing and having a first end, a second end, and a centrally located ball portion;
a first plate coupled to the control shaft;
a second plate coupled to the control shaft;
the housing including first guide means for restricting motion of the first plate to a first path within a first plane substantially orthogonal to the axis of the control shaft in its centered position, and second guide means for restricting motion of the second plate to a second path within a second plane substantially orthogonal to the axis of the control shaft in its centered position, the second path being substantially perpendicular to the first path;
first analog means for providing a first analog impedance corresponding to the position of the first plate relative to the housing;
second analog means for providing a second analog impedance corresponding to the position of the second plate relative to the housing;
a pivot mounted to the housing wherein the first end of the control shaft is pivotally coupled to the pivot, and the first and second plates are coupled to the control shaft at positions intermediate the ends of the control shaft;

wherein the first plate further comprises a first generally elongated aperture for coupling motion of the control shaft in the first path to motion of the first plate and for not coupling motion of the control shaft in the second path to the first plate, the first generally elongated aperture having its elongated dimension along the second path; and wherein the second plate further comprises a second generally elongated aperture for coupling motion of the control shaft in the second path to motion of the second plate and for not coupling motion of the control shaft in the first path to the second plate, the second generally elongated aperture having its elongated dimension along the first path; and a slide block rotatably secured to the centrally located ball portion, the slide block being slideably received within the first and second generally elongated apertures for movement relative to the first plate along the long axis of the first aperture and relative to the second plate along the long axis of the second aperture.

19. An analog joystick as in claim 18 wherein the first analog means is a first rotary analog potentiometer coupled to the housing and to the first plate having a first rotatable shaft oriented orthogonally to the first plate; and wherein the first plate is further characterized by a third generally elongated aperture; and wherein the joystick further comprises first crank means coupled to the first rotatable shaft slideably received by the third aperture for rotating the first rotatable shaft in response to movement of the first plate along the first path.

20. An analog joytstick as in claim 19 wherein the second analog means is a second rotary analog potentiometer coupled to the housing and the second plate having a rotatable shaft oriented orthogonally to the second plate; and wherein the second plate is further characterized by a fourth generally elongated aperture; and wherein the joystick further comprises second crank means coupled to the second rotatable shaft and slideably received by the fourth aperture for rotating the rotatable shaft in response to movement of the second plate along the second path.

* * * * *